Patented May 2, 1933

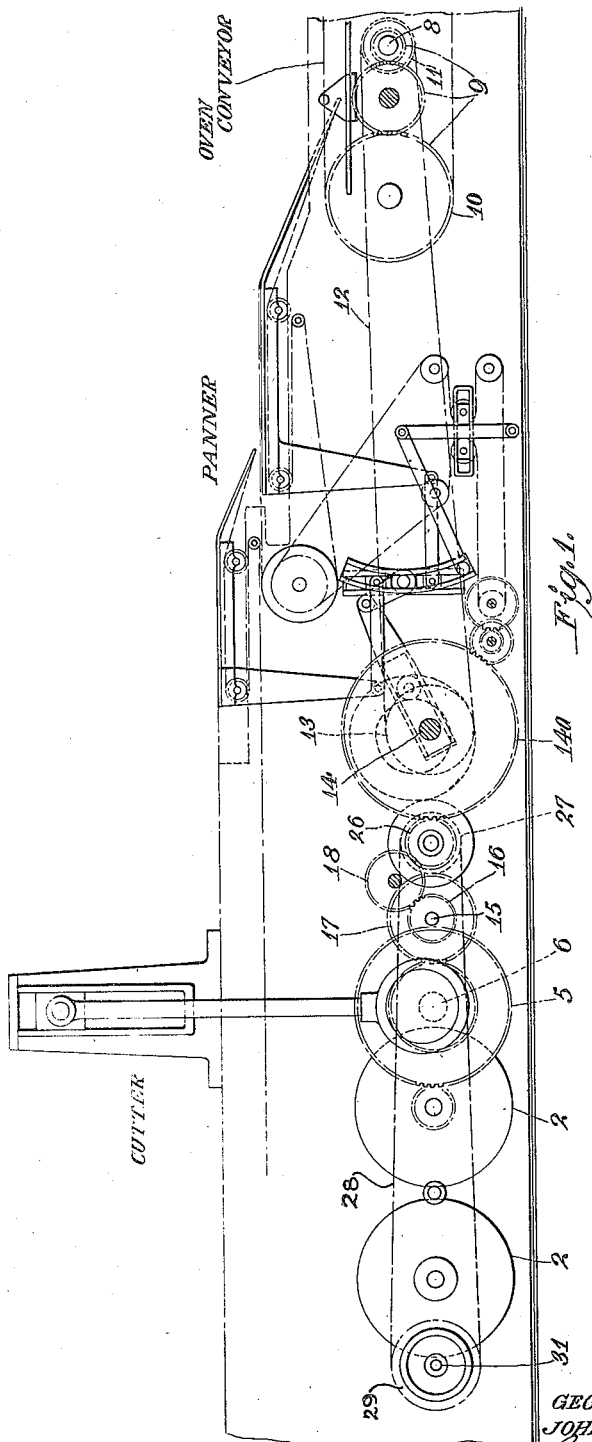

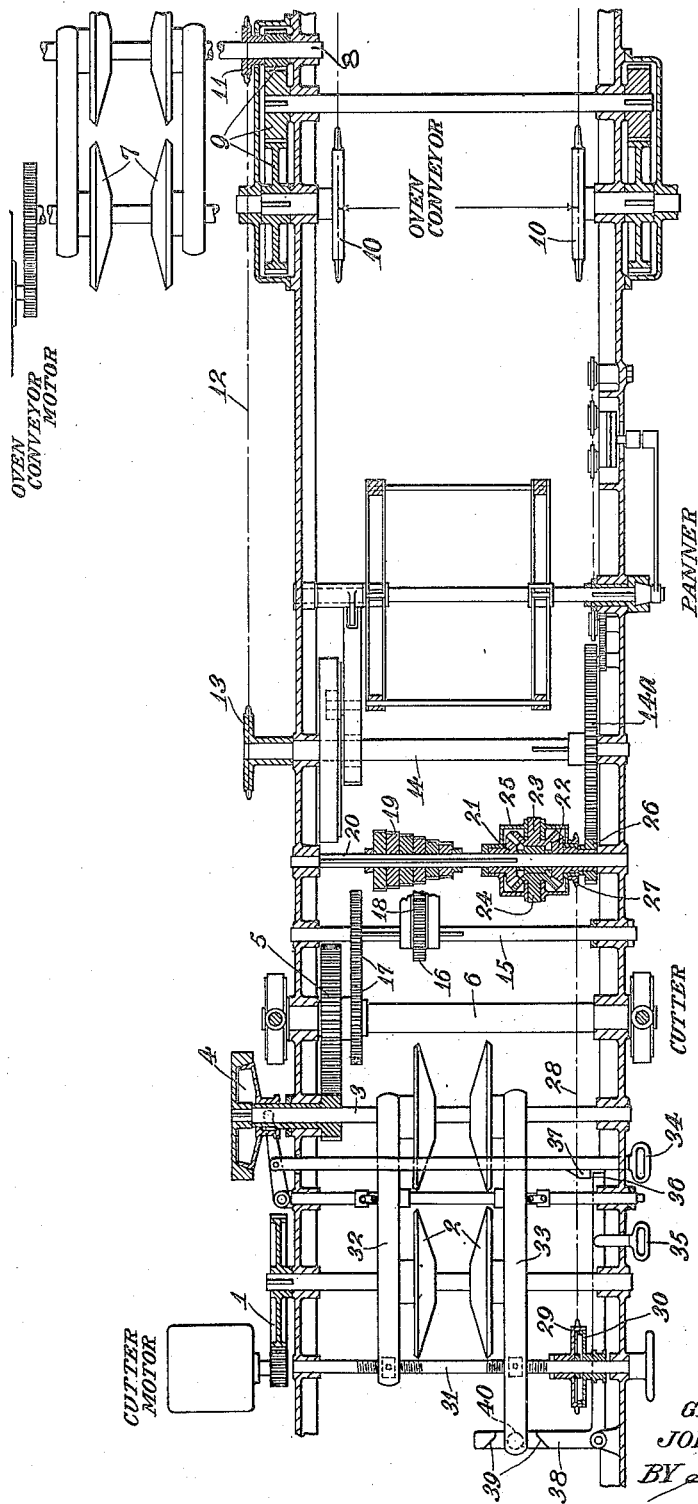

1,906,831

UNITED STATES PATENT OFFICE

GEORGE RALPH BAKER AND JOHN CURRIE PATERSON, OF WILLESDEN, LONDON, ENGLAND

SYNCHRONIZING APPARATUS FOR BISCUIT MACHINES AND THE LIKE

Application filed August 22, 1930, Serial No. 476,962, and in Great Britain August 26, 1929.

This invention relates to methods and means for controlling or obtaining synchronization between a pair of independently driven machines or mechanisms. The invention is particularly applicable to associated machines which are functionally dependent one upon the other and either or both of which are subject to variations of speed or rate of operation of certain parts. For example, the invention is adapted to fulfil the requirements of a combined plant comprising a continuous baking oven of the pan mechanism type and a cutting machine for biscuits and the like wherein variations of oven speed according to baking requirements have to be provided for and the cutting and delivery of batches of biscuit shapes must synchronize with the travel of the pans.

This invention therefore has particular relation to machines for cutting biscuits and the like, panning them and delivering them to the travelling conveyor of a bake oven, and pertains more particularly to a novel means for maintaining synchronism of the cutter operations and the speed of travel of the oven conveyor.

As is known, biscuit cutting machines have heretofore been built in conjunction with travelling oven conveyors associated with panning mechanisms, and it has been customary to operatively connect all three of these mechanisms by drive shafts or otherwise, and to drive them all from one source of power, in which case synchronism was attained, but under certain practical disadvantages that are overcome in our invention.

It has been found that the desired speed of the cutter, panner and oven conveyor can be satisfactorily maintained only so long as they are all operating under normal baking conditions. When it becomes necessary to stop the cutter for changing the pattern of the goods, to change the speed of the oven conveyor because of change in the baking quality of the dough-pieces, then the desired synchronism can no longer be maintained, because the motor that drives all three of the above mentioned elements, namely, the cutter, panner and oven conveyor, changed speed whenever, for example, the cutter was stopped, and that changed the speed of the oven conveyor and interfered with proper baking.

Therefore, it is desirable in practice to drive the oven conveyor and panner from one motor and the cutter from a different motor, so that the speed of either may be changed, or even stopped, without interfering with the proper power transmission to the other. Independent motor drives for the cutter and oven conveyor, however, prevent maintaining proper synchronization.

It is an object of this invention to provide, in combination with a unit consisting of a cutter, oven conveyor and panner, an and inexpensive yet effective, simple means for maintaining their synchronism under wide variations of baking or cutting requirements, while driving the cutter and the oven conveyor with its connected panning mechanism from independent source of power.

A further object is to provide in connection with such an automatic synchronizing apparatus means for changing step-by-step the normal or standard speed ratios desired to be maintained between the cutter and the oven conveyor, so that by various adjustments of this step-by-step gearing the cutter and oven conveyor can be mutually adapted to produce, say, large pieces of goods which entail a relatively slow speed of the cutter, compared with the conveyor travel, or on the other hand producing relatively smaller pieces which entails a faster speed of the cutter, compared with the speed of the conveyor.

The invention, therefore, consists in providing a mechanism that preferably includes gears arranged in conical or step form, shiftable for various general speed settings, in combination with a controller comprising two rotary elements, each independently driven from one of the machines to be kept in synchronism, together with an operative connection to the adjuster of a variable speed gear in the drive of one of the machines, by which any relative displacement of the elements due to a difference in their speeds operates to adjust the speed of the cutter with relation to the speed of the conveyor. The cone gears and the controller are preferably associated with a shaft common to both, one of the elements of the controller turning with the cone step gears and the opposite element of the controller traveling with the oven conveyor and with the panner driven by it.

The floating gears of the differential are mounted in a cage in the usual manner so that when the cutters and the oven conveyor are properly synchronized the cage of the differential remains still, but whenever, for any reason, the relative speeds of the cutter and oven conveyor vary from a predetermined normal and synchronized speed, then the differential cage revolves.

The revolvable cage is connected by chain drive or otherwise with a suitable speed adjusting mechanism of any well known type, here shown as of the well known speed-cone type, between the cutter motor and the cutter. In the drawings the well known belt-type variable speed gear is shown. With this arrangement the cutter motor may maintain its normal constant speed and so long as the differential cage does not rotate the cutters will operate at a given speed corresponding to the speed of the cutter motor, but whenever the cage is caused to rotate by reason of any variation in speed either of the cutters or of the oven conveyor, then the variable speed gear will be automatically adjusted to restore synchronism between the cutter and the conveyor.

The present invention also includes means for simultaneously throwing out of action the cutters and the speed-adjusting mechanism of the variable speed gear in order to stop the cutters without having the resulting rotation of the differential cage disturb the predetermined ratio of the cutter speed to the speed of the oven conveyor.

The invention also includes means whereby the cutter may be thrown into action without simultaneously putting the differential adjustment of the variable speed gear into operation. The purpose of this arrangement is to enable the cutter motor to be started and the cutters to commence cutting while the oven conveyer is in operation, giving them opportunity to pick up their proper speed without disturbing the adjustment of the variable speed gear.

For throwing the automatic synchronizing mechanism into operation after such normal speed has been obtained a separate clutch arrangement is provided between the controller and the adjusting means of the variable speed gear. After this clutch is thrown into action any minor fluctuations in the relative speeds of the cutters and of the oven conveyor due to changes in baking conditions will be maintained in synchronism automatically.

With the foregoing and certain other objects in view, which will appear later in the specification, our invention comprises the devices described and claimed and the equivalents thereof.

In the drawings Fig. 1 is a part diagrammatic side view of a machine comprising the cutter, panner and oven conveyor, with my improved synchronizing device applied.

Fig. 2 is a top plan view of the same, the frame being shown in horizontal section, with the cutting mechanism, the panner belts and panner blades removed.

In the drawings the cutter is shown as arranged to be driven from the cutter motor through the medium of suitable gears 1, a variable speed gear consisting of the usual pairs of axially adjustable cones 2, shaft 3, clutch 4, gears 5, and cutter-operating shaft 6. The cutter, conveyor, passing under the cutter is driven by the cutter drive mechanism, in known manner. The oven conveyor is driven by the oven conveyor motor through another variable speed gear device 7, shaft 8, train of gears 9 and sprockets 10 in the usual way.

The panner mechanism, of any suitable or well known type, such as the reciprocatory blade shown, over which the cutter conveyor passes, may conveniently be driven from the oven-conveyor motor by means of sprocket 11, chain 12, sprocket 13 and panner drive shaft 14 and gear 14a.

The panner mechanism which I have chosen for purposes of illustration is shown and described in co-pending Patent No. 1,787,254, being the joint invention of present applicant George Ralph Baker, and Herbert Kirman. Being driven by shaft 14 and the oven conveyor in the manner set forth in the above mentioned application, the panner does not affect the operation of the present invention and, therefore, need not be further described in this connection.

The cutter motor drives shaft 6, the oven conveyor motor drives shaft 14, and our improved synchronizing mechanism is preferably applied between these two shafts in such a manner as to attain the automatic synchronization above stated as objects of our invention.

A spline shaft 15 carrying a sliding pinion 16 is geared to shaft 6 by means of a suitable train of gearing 17. Associated with the sliding pinion is an intermediate pinion 18 that can be made to mesh with any one of a plurality of stepped gears 19 keyed to a shaft 20. By shifting gears 16 and 18 along shaft 15 and putting them into mesh in known manner with any chosen one of the steps 19 the shaft 20 will be driven at a predetermined speed corresponding to the speed of shaft 6, and by the action of the differential gear next described, the variable speed gear 2 is adjusted to operate the cutter at the desired speed.

On shaft 20 a differential gear is provided, one of its bevel pinions 21 fixed to the shaft, its other pinion 22 being loose thereon. The floating pinions 23, 24 and the cage 25 are all mounted in the usual manner of differential gears.

The hub of pinion 22 has fixed to it a pinion 26, which is connected to shaft 14 by a gear 14a of the panner drive shaft 14.

It is now evident that shaft 14 may be regarded, for the purpose of the present description, as any shaft that has rotation corresponding to the speed of the oven conveyor. The sprockets 11, 13 and their drive chain 12 may be viewed as merely a typical example of any suitable means for bringing the oven conveyor speed into operative relationship with the bevel pinion 22 of the differential gear. Similarly shaft 15 is a typical representation of appropriate means for bringing the rotary movement of cutter shaft 6 into operative relationship with the other bevel pinion 21 of the differential gear.

When the gears 21 and 22, representing the opposite poles of the differential gear, rotate at identical speeds in opposite directions the cage 25 will not rotate, but whenever there is a difference in the speeds of rotation of gears 21 and 22, then the cage 25 rotates slowly in one direction or the other, depending upon the motion and trend of speed variations of bevel pinions 21 and 22.

Fixed to the cage is a chain wheel 27 connected by chain 28 to a chain wheel 29 that is connected, through clutch 30, to the adjusting screw 31 of the variable speed gear. When adjuster 31 is turned it actuates the bars 32 and 33 and the pulley 2 of the speed-cone gear in known manner, and correspondingly changes the speed of shafts 3, 6, 15, 20 and the differential gear 21. The arrangement is such that this speed change modifies the speed of the cutter so as to bring it into synchronism with the speed of the conveyor.

To halt the cutters while the cutter motor is in operation the clutch 4 may be thrown out by means of a shifter 34. To throw the clutch 30 into and out of operation another shifter 35 is provided. An extension 36 of shifter 35 and a lug 37 of shifter 34 are so arranged that both clutches 30 and 4 can be simultaneously thrown out by pulling the shifter 34 out or away from the machine. Clutch 4 can be thrown into action independently of clutch 30 by pushing in the shifter 34, leaving the clutch 30 disconnected.

Automatic means may also be provided for throwing out clutch 30 to disconnect the automatic synchronizing function of the apparatus whenever the variable speed gear 2 reaches a limit of adjustment. This automatic clutch-actuating device consists of a laterally extending arm 38 integral with the shifter 35, the arm having cam faces 39 that actuate a roller 40 on bar 33. When the screw 31 drives the bar 33 to the extreme limit of its oscillation in either direction roller 40 operates on the cams 39 to actuate the shifter and throw out clutch 30, the same as if they were actuated by hand.

The mode of operation of the invention is as follows: The oven conveyor is assumed to be in operation and driven by an oven conveyor motor which also drives the panner shaft 14 and, through gear 14a, the differential pinion 22. It is further assumed that the cutter motor is in operation, driving the cutters to produce biscuits at a rate appropriate to supply the oven conveyor. Under these conditions there is no rotation of the differential cage and no change of the adjustment of speed cones 2.

Suppose, however, the baker changes the speed of the oven conveyor. Immediately the differential speed is transmitted to the cage 25 and it actuates the adjuster, screw 31, to change the speed ratio of variable speed gear 2, thus bringing the revolutions of the gear 21 back into synchronism with those of gear 22 and restoring the synchronous operation of the cutter and oven conveyor. If the operator desires to change the cutters without stopping the oven conveyor, in order to make, for example, larger biscuits, which require a slower speed of cutting or if he wishes to spread the biscuits on the oven conveyor, placing fewer rows on each pan, he pulls out shifter 34 and thereby disconnects clutches 4 and 30, stopping the cutter without stopping the cutter motor.

After the cutters have been changed, the operator chooses a gear 19 of proper diameter to give the desired new speed ratio between the oven conveyor and the cutter, and connects the gears 16 and 18 to the chosen gear of the step-cone 19.

The operator then throws in shifter 34, closing the clutch 4, starting the cutter and setting the differential gear 21 to rotating.

After the cutter and its associated mechanism has had time to pick up its proper speed from the cutter motor, the operator pushes in shifter 35 and clutch 30, thereby restoring the automatic functioning of cage 25 with relation to the step cones 2. From then on until clutch 30 is again disconnected the speed of the cutter is automatically controlled to maintain its new ratio to the speed of the oven conveyor.

By the means above described we have made it possible to use independent motor drives for the cutter and conveyor and yet secure correct synchronization between them regardless of all intermediate variations of conveyor speed.

For the purposes of this specification we have described and shown our invention applied to the drive mechanisms of a biscuit cutting machine and a traveling-conveyor bake oven. It is not limited in its scope to this combination, as it is equally applicable to any two machines having separate sources of driving power which must be operated at synchronous speeds. For example, it can be employed between consecutive units of a paper-making plant. In general it is capable of use wherever goods in continuous process are transferred from one machine or conveyor unit to another.

Further, we do not limit ourselves to a differential gear of the particular form shown in the drawings, but by the term "differential gear" used in the claims we mean any suitable form of controller mechanism having two rotary members which, when driven at different speeds, by their relative displacement set in motion in one direction or the other an operative connection to the adjuster of the variable speed gear.

Having thus described our invention, what we claim and desire to secure by Letters Patent is:

1. In combination, an oven conveyor operatively connected to a source of power, a cutter connected to a different source of power, a differential gear, power transmission means connecting the opposite poles of said differential gear to the conveyor and to the cutter respectively, a variable speed gear operatively interposed in the power connection from the cutter to its source of power, said variable speed gear having an adjuster, means operatively connecting said adjuster to the cage of the differential gear and adapted to translate movement of rotation of said cage into movement of adjustment of said variable speed gear.

2. In combination, an oven conveyor operatively connected to a source of power, a cutter connected to a different source of power, a differential gear, power transmission means including sliding gears and a plurality of stepped gears connecting a pole of said differential gear to the cutter, power transmission means connecting the opposite pole of the differential gear to the conveyor, variable speed gear operatively interposed in the power connection to the cutter from its source of power, said variable speed gear having an adjuster, means operatively connecting said adjuster to the cage of the differential gear and adapted to translate movement of rotation of said cage into movement of adjustment of said variable speed gear.

3. In combination, an oven conveyor operatively connected to a source of power, a cutter connected to a different source of power, a differential gear, power transmission means connecting the opposite poles of said differential gear to the conveyor and to the cutter respectively, a clutch and a variable speed gear operatively interposed in the power connection to the cutter from its source of power, said variable speed gear having an adjuster, means including a second clutch operatively connecting said adjuster to the cage of the differential gear and adapted to translate movement of rotation of the cage into movement of adjustment of said variable speed gear, said clutches connected for disconnection simultaneously and said clutch in the cutter drive arranged for operative connection independently of said second clutch.

4. Apparatus for synchronizing two machines driven by independent prime movers, comprising in combination a variable speed gear operatively interposed in the power connection from one of said machines to its prime mover, said variable speed gear having an adjuster, a differential gear having three elements, a driving connection from one of said elements to one of said machines, a second driving connection from the second of said elements to the second of said machines, and an operating connection from the third element of said differential gear to the adjuster of said variable speed gear, whereby a movement of said third element caused by a difference in the speed of the machines adjusts said variable speed gear so as to drive the machine connected to it at the same speed as said other machine.

5. An apparatus as described in claim 4 wherein there is provided a clutch in said operating connection from the third element of said differential gear to the adjuster of said variable speed gear, and means associated with said variable speed gear to disengage said clutch at either extremity of adjustment of said gear.

6. A structure as set forth in claim 3 wherein said second clutch is provided with a disengaging mechanism and said adjuster is provided with a member adapted to actuate said disengaging mechanism automatically to throw out said clutch when the adjuster reaches either extremity of its normal range of adjustment.

7. In a baking plant comprising a cutter, a bake oven conveyor, and a panner, said cutter driven from one source of power and said oven conveyor and panner driven from a second independent source of power, in combination, a variable speed gear operative between the cutter and its source of power, an adjuster for said variable speed gear, a controller having two rotary members, a driving connection between said cutter and one of said rotary members, an independent driving connection between the drive mechanism of said oven conveyor and panner and the other of said rotary members, and operative connections for communicating relative displacement of said rotary members to said adjuster of the variable speed gear.

8. Apparatus as claimed in claim 7, wherein speed-changing gears are incorporated in the driving connection between said cutter and the rotary element of said controller.

9. Apparatus for synchronizing two machines driven by independent prime movers, comprising in combination a variable speed gear operatively interposed in the power connection from one of said machines to its prime mover, an adjuster associated with said variable speed gear, a controller comprising two rotary elements, a driving connection from one of said elements to one of said machines, a second independent driving connection from the second of said elements to the other machine, and means for communicating relative displacement of said elements due to difference in speed to said adjuster of the variable speed gear.

In testimony whereof, we affix our signatures.

GEORGE RALPH BAKER.
JOHN CURRIE PATERSON.